United States Patent
Garg et al.

(10) Patent No.: US 7,076,609 B2
(45) Date of Patent: Jul. 11, 2006

(54) CACHE SHARING FOR A CHIP MULTIPROCESSOR OR MULTIPROCESSING SYSTEM

(75) Inventors: Vivek Garg, Folsom, CA (US); Jagannath Keshava, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 308 days.

(21) Appl. No.: 10/251,096

(22) Filed: Sep. 20, 2002

(65) Prior Publication Data

US 2004/0059875 A1    Mar. 25, 2004

(51) Int. Cl.
*G06F 12/00*    (2006.01)

(52) U.S. Cl. ............................ 711/120; 711/3; 711/133; 711/148

(58) Field of Classification Search .................... 711/3, 711/130, 119, 120, 148, 133, 134, 159, 160, 711/121, 170, 128; 709/214, 216
See application file for complete search history.

(56) References Cited

U.S. PATENT DOCUMENTS

| | | | |
|---|---|---|---|
| 6,542,965 B1 * | 4/2003 | Lesartre ...................... 711/128 |
| 6,571,317 B1 * | 5/2003 | Supnet ........................ 711/133 |
| 6,591,347 B1 * | 7/2003 | Tischler et al. .............. 711/134 |
| 6,640,286 B1 * | 10/2003 | Kawamoto et al. ......... 711/133 |
| 6,725,336 B1 * | 4/2004 | Cherabuddi .................. 711/129 |
| 2002/0194458 A1 * | 12/2002 | Soni ........................... 712/227 |
| 2003/0028747 A1 * | 2/2003 | Denneau et al. ............ 711/206 |
| 2003/0167379 A1 * | 9/2003 | Soltis, Jr. ..................... 711/119 |
| 2003/0208658 A1 * | 11/2003 | Magoshi ...................... 711/122 |

OTHER PUBLICATIONS

Patterson et al., "Computer Architecture: A Qualitative Approach," Morgan Kaufmann Publishers, Inc., 1996, pp. 38, 378-379.*
"IEEE 100: The Authoritative Dictionary of IEEE Standards Terms 7th Edition," Standards Information Network IEEE Press, 2000, p. 135.*
"Microsoft Computer Dictionary 5th Edition," Microsoft Press, 2002, p. 81.*
Hennessy et al., "Computer Organization and Design: The Hardware/Software Interface," Morgan Kaufmann Publishers, Inc., 1998, pp. 568-579.*

* cited by examiner

*Primary Examiner*—Hong Chong Kim
*Assistant Examiner*—Shane M. Thomas
(74) *Attorney, Agent, or Firm*—Thomas R. Lane

(57) ABSTRACT

Cache sharing for a chip multiprocessor. In one embodiment, a disclosed apparatus includes multiple processor cores, each having an associated cache. A control mechanism is provided to allow sharing between caches that are associated with individual processor cores.

23 Claims, 8 Drawing Sheets

CACHE SHARING FOR A CHIP MULTIPROCESSOR OR MULTIPROCESSING SYSTEM

BACKGROUND

1. Field

The present disclosure pertains to the field of processing systems and their associated caching arrangements.

2. Description of Related Art

Improving the performance of computer or other processing systems generally improves overall throughput and/or provides a better user experience. One technique of improving the overall quantity of instructions processed in a system is to increase the number of processors in the system. Implementing multiprocessing (MP) systems, however, typically requires more than merely interconnecting processors in parallel. For example, tasks or programs may need to be divided so they can execute across parallel processing resources, memory consistency systems may be needed, etc.

As logic elements continue to shrink due to advances in fabrication technology, integrating multiple processors into a single component becomes more practical, and in fact a number of current designs implement multiple processors on a single component (a "multicore processor"). Multicore processors also typically integrate some additional cache memory in addition to any caches closely associated with each processor core, and varying techniques are used to maintain coherency across the hierarchy within the multicore processor device.

For example, in one prior art processor, a level one (L1) cache associated with each processor core is implemented as a write through cache, such that a shared level two (L2) cache receives all modifications by each L1. While using write-through is known to be inferior in performance under some circumstances compared to using a protocol such as the well known four state MESI (Modified, Exclusive, Shared, Invalid) protocol, the use of write-through eliminates the need for cross-interrogation of the L1 caches in this prior art multicore processor. Without cross-interrogation between L1 caches, no snoop bus is provided between L1 caches, and no L1-to-L1 transfers may occur. Moreover, since there is no cross communication between the L1 caches, no sharing of caching resources associated with particular processor cores occurs. Only the L2, which is not associated with any particular processor core, is shared between the separate processor cores.

In another prior art multicore processor, two L1 caches are also separated by the L2 cache. In this prior art processor, the core logic is linked directly to the L2 cache control logic and to the private L1. Thus, coherency lookups in the L1 and L2 may begin simultaneously; however, the L2 control logic separates the L1 associated with the first core from the L1 associated with the second core. Therefore, again the L1 caches private to and associated with each processor are not linked to each other. Accordingly, there is no direct cross-interrogation between L1 caches and no direct L1-to-L1 data passing, or sharing of the L1 caches between the separate cores. Only the L2, which is not associated with any particular processor core, is shared between the separate processor cores.

BRIEF DESCRIPTION OF THE FIGURES

The present invention is illustrated by way of example and not limitation in the Figures of the accompanying drawings.

DETAILED DESCRIPTION

The following describes embodiments of cache sharing for a chip multiprocessor or multiprocessing system. In the following description, numerous specific details are set forth in order to provide a more thorough understanding of the present invention. It will be appreciated, however, by one skilled in the art that the invention may be practiced without such specific details.

Various disclosed embodiments allow cache sharing between caches that may be associated with individual processors in a multiple processor environment. Such cache sharing may advantageously boost performance because individual processors may effectively gain access to a larger cache. Moreover, some disclosed embodiments may allow various modes to be selected to meet particular performance or power consumption constraints. Additionally, such modes may be dynamically selectable in some cases, as may a cache data replacement policy.

Figure 1:
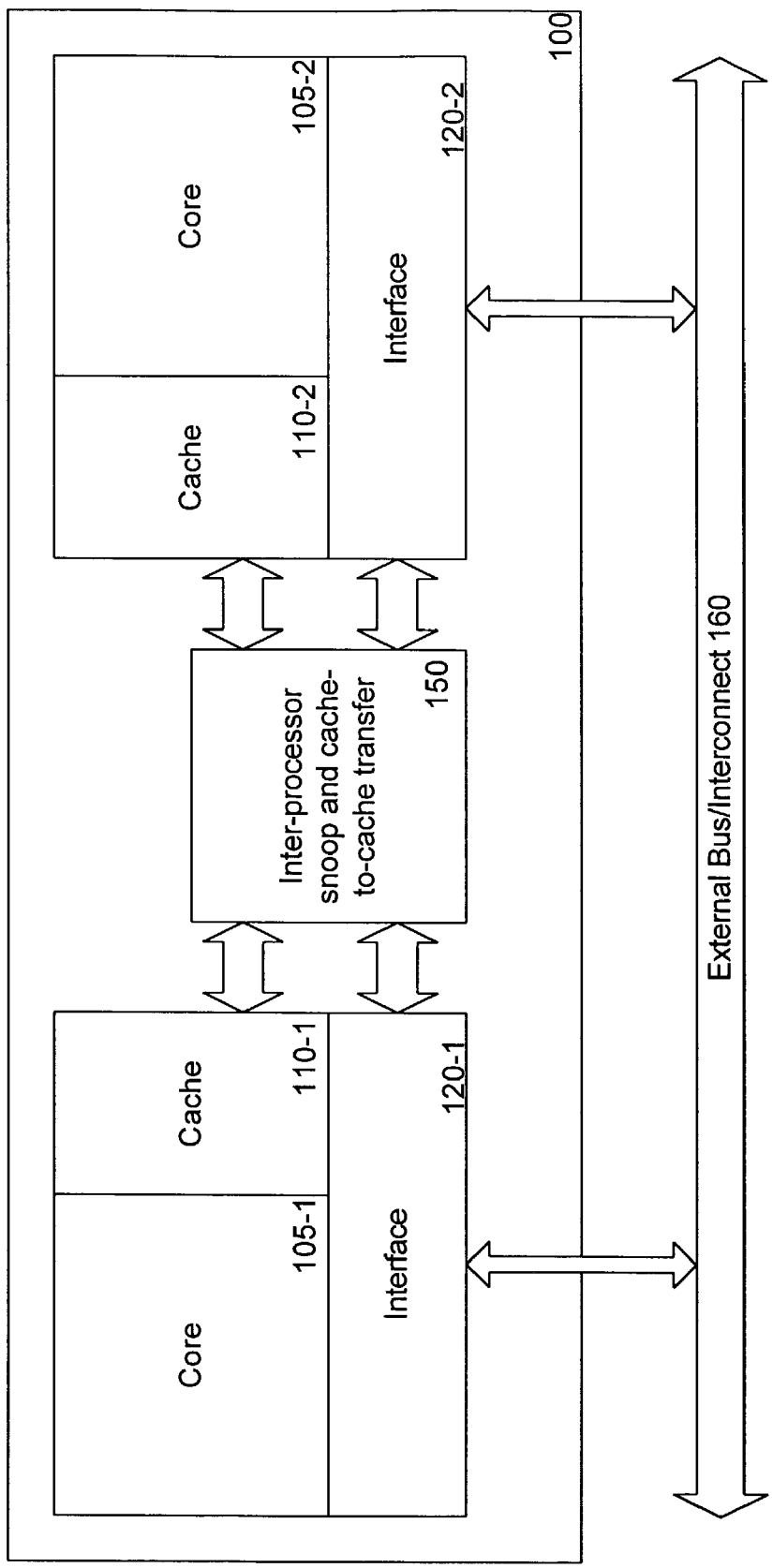
FIG. 1 illustrates one embodiment of a cache sharing system for an apparatus such as a chip multiprocessor.

FIG. 1 illustrates one embodiment of a cache sharing system. In the embodiment of FIG. 1, a multiprocessor 100 may be a multiple chip card, board, or the like, or a multiprocessor component such as a chip multiprocessor or a multiple chip module. A chip multiprocessor is a single integrated circuit which contains multiple processing cores, with each processing core being a processor capable of executing instructions. In the embodiment of FIG. 1, a first core 105-1 and a second core 105-2 are shown; however, additional cores may be included in some embodiments.

In the embodiment illustrated in FIG. 1, each core has an associated cache and an interface to communicate with an external bus/interconnect 160. Thus, the core 105-1 has a cache 110-1 associated therewith and an interface 120-1 to allow communications with the external bus/interconnect 160. The core 105-2 has a cache 110-2 associated therewith and an interface 120-2 to communicate with other components via the external bus/interconnect 160. The external bus may be a point-to-point interconnect or may be a two point or multidrop bus in other embodiments. Various known or otherwise available bus, interconnect, or other communication protocols may be employed to allow communications with other external components such as memories, other processors, input/output components, bridges, etc.

The caches 110-1 and 110-2 are associated with respectively cores 105-1 and 105-2 in two ways. First, the associated processor core normally presents memory accesses to cacheable memory space to the associated cache, as opposed to only presenting cycles to the cache as inquiry or snoop cycles. Secondly, the associated cache includes a cache memory array which is separate and distinct from other cache memory arrays that are associated with other processors. Typically, the cache array is located in close physical proximity to the associated core, or some portion thereof. Generally, an associated cache is in closer physical proximity to the processor core with which it is associated than to other processor cores.

As illustrated in FIG. 1, an interprocessor snoop and cache-to-cache transfer mechanism 150 links the two processors. In the illustrated embodiment, the mechanism 150 provides a communication link between the caches 110-1 and 110-2 and the interfaces 120-1 and 120-2. The mechanism 150 allows cache sharing of the caches 110-1 and 110-2. Cache sharing allows each processor to use the cache associated with the other processor for storage, at least under some conditions. Therefore, each processor may effectively gain access to a larger cache. Additionally, snoop cycles may be handled between the processors without resort to the external bus/interconnect 160 via the mechanism 150, and data may be shared between processors in response to snoop cycles to the extent the data is not already accessible to both processors. Any pre-existing or otherwise available snoop mechanism may be integrated to allow any cross interrogation needed (e.g., if partial sharing occurs or if sharing is dynamically enabled and disabled).

According to various disclosed embodiments, one processor may directly query other processors' associated caches. Directly querying the other caches means that one or more of the other caches is queried as another source of storage for data as a part of satisfying the request, and not just as a part of a snoop cycle to determine if the other cache has modified data. As such, a directly queried cache may be considered shared between multiple processors with such direct querying capabilities.

Sharing associated caches may be particularly advantageous where multiple instantiations of a processor are integrated in a single integrated circuit die or other component. In some cases, the processor replicated may be or may be derived from a pre-existing design and may include a processor associated cache. In such a case, it may be desirable to leave the processor itself substantially intact to reduce design cycle time. Therefore, leaving the processor largely unchanged, with limited modifications to an associated cache and related control circuitry to allow better overall cache utilization via sharing may be an attractive option.

Thus, an inter-processor snoop and sharing mechanism may be used to link caches that are otherwise closely associated with individual processor cores. Such additional coupling may advantageously lead to more efficient operation under a variety of circumstances. Not only may one processor gain access to effectively a larger cache memory, but also various modes may be selected to achieve different levels of performance or power consumption.

Figure 2A:
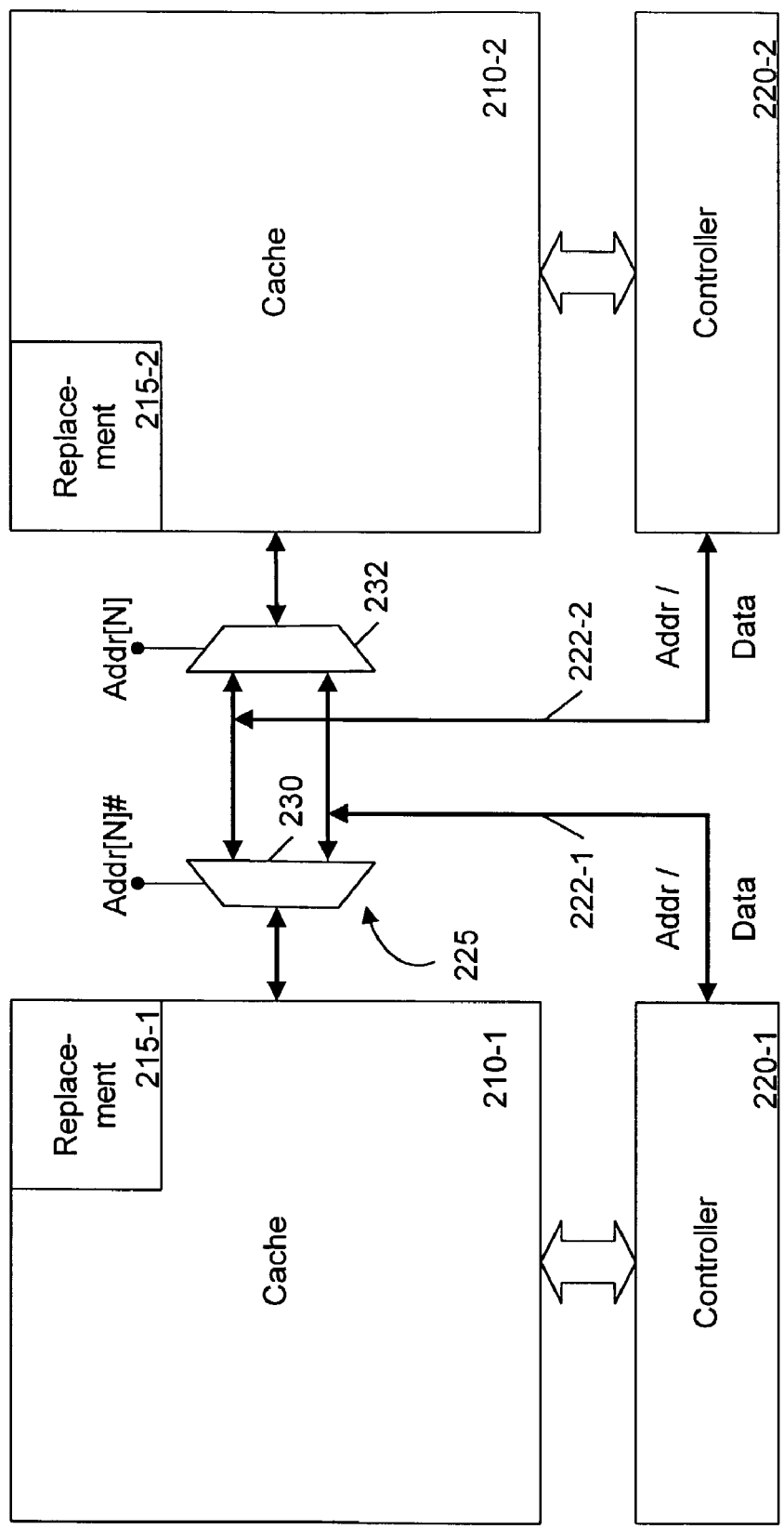
FIG. 2a illustrates one embodiment of a cache sharing mechanism using set expansion.

FIG. 2a illustrates an embodiment of a cache sharing mechanism whereby a logical cache size increase is achieved using set expansion when sharing is enabled. In the embodiment of FIG. 2a, a first cache 210-1 and a second cache 210-2 are coupled by a cache sharing mechanism 225. The cache sharing mechanism 225 includes a first selector 230 (e.g., a multiplexer) and a second selector 232. Each cache 210-1 and 210-2 has a controller, respectively 220-1 and 220-2 to provide normal read and write control, snoop control, data selection and multiplexing, etc. In this embodiment, each cache has its own replacement logic 215-1 and 215-2 to implement a replacement policy (e.g., a Least Recently Used (LRU) or other known replacement policy) for each cache array individually. In this embodiment, local replacement policies may be appropriate to control eviction because all ways for each set are contained within one cache.

The first selector 230 selects the route of the data and requests to and from the cache 210-1. Addresses (requests) from either controller 220-1 or 220-2 on respectively signal lines 222-1 and 222-2 may be passed to the cache 210-1 via the selector 230, and likewise data may be returned to either controller. Similarly, communication between either controller 220-1 and 22-2 and the cache 210-2 may be accomplished via the selector 232.

With respect to overall operating modes, the modes shown in Table 1 may be used for various embodiments.

TABLE 1

Operating Modes

| Mode | Description | Power | Performance |
|---|---|---|---|
| 1 | Both cores and L2 caches available and operating individually | High | High |
| 2 | One core and both L2 caches available | Medium | Medium |
| 3 | One core and one L2 cache available | Low | Low |
| 4 | Both cores share both L2 caches | High | Higher |

In the first operating mode, both cores operate with each core using its own cache as a dedicated private cache. In the second mode, one core is disabled, and the other core is allowed to take advantage of the cache of the disabled core. In this mode, a first type of sharing occurs wherein the cache of a disable processor is shared with an active processor such that the active processor has additional cache capacity available. In the embodiment of FIG. 2a, the cache of the second processor is used to increase the total number of cache sets available to the active processor. Therefore, the selectors 230 and 232 use an Nth bit of the address (or the tag) to determine which cache to access.

TABLE 2

Address to Tag and Set Mapping

| Bit #/ Cache Mode | M | N | N − 1 | P + 1 | P | 0 |
|---|---|---|---|---|---|---|
| Single Array | Tag | | N − 1 Set Number | | P | 0 Bytes |
| Dual Array | Tag | N | Set Number | | P | 0 Bytes |

In the single array case (e.g., operating modes 1 or 3), a cache is used individually by a processor. In the dual array case (e.g., operating modes 2 or 4), both arrays are used together to form a single larger cache with twice as many sets in this embodiment.

For example, assuming that the core associated with cache 210-1 is active, cache requests from the core are passed to controller 220-1 accordingly. Addresses from the controller 220-1 may be passed through the cache sharing mechanism 225 before being provided to a cache array. In the embodiment of FIG. 2a, lower addresses are mapped to the first cache 210-1 because the Nth address bit being zero causes the selector 230 to select its input from the controller 220-1. Likewise, upper addresses are mapped to second cache 210-2 because the Nth address bit being one causes the selector 232 to pass through commands from the controller 220-1. Therefore, if the Nth bit is a zero, the access is passed via the selector 230 to the cache 210-1. If the Nth bit is a one, then the access is passed to the second cache 210-2. In this case, the cache sizes are equal, and the effective cache available to the active processor is doubled.

Likewise, when data is read from one of the caches, the data is properly selected based on its address and sent to the proper controller via one of the selectors 230 or 232. In some embodiments, different cache sizes may be used for the different processors, so additional logic may be used to generate a cache select signal to indicate which cache to access. Moreover, additional signals (beyond just the address and data) associated with each cache access request may be passed to and from the appropriate cache, and various selection mechanisms may be used to mask out inappropriate requests and/or direct the appropriate requests to the proper cache array.

Figure 2B:
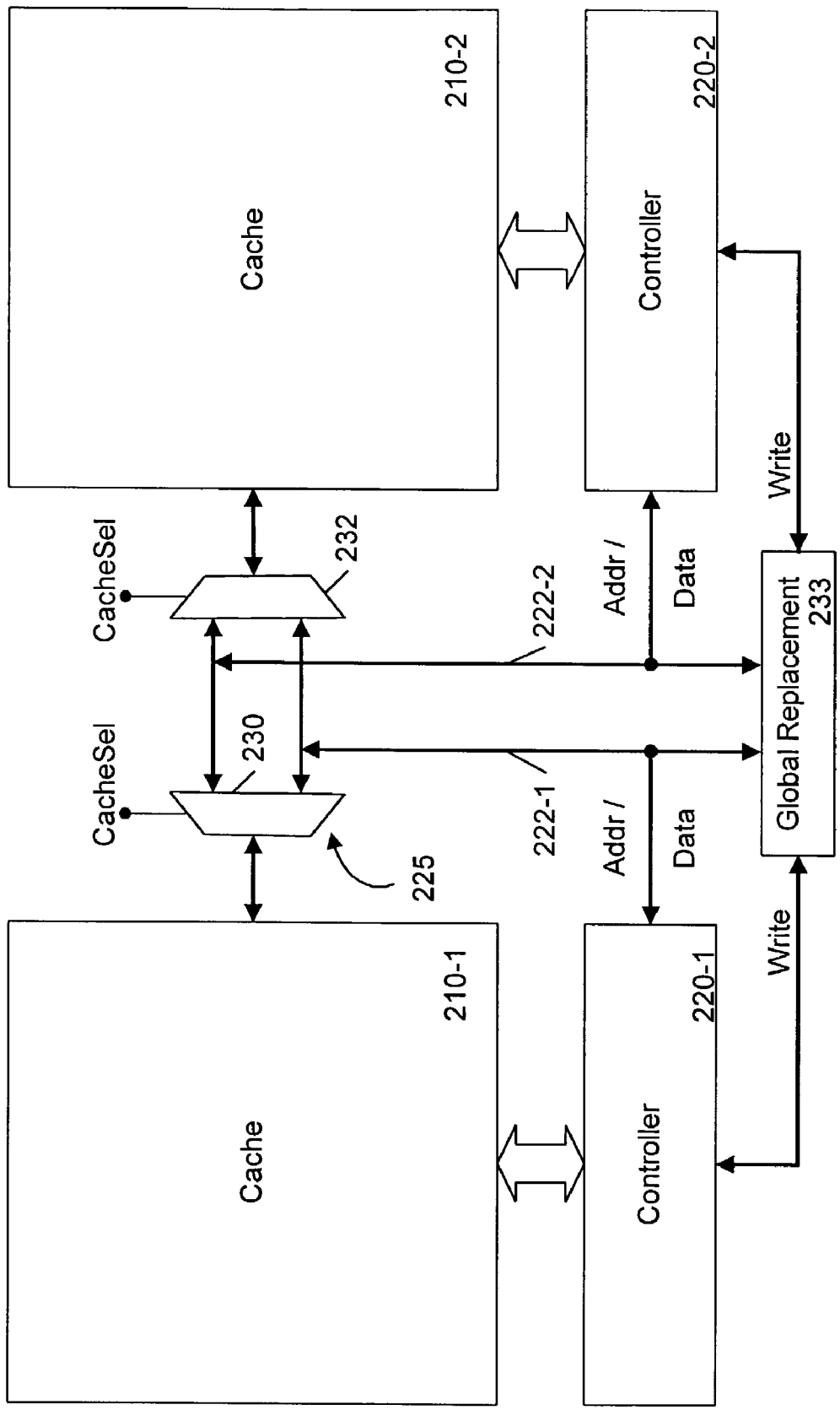
FIG. 2b illustrates one embodiment of a cache sharing mechanism having a global replacement mechanism.

FIG. 2b illustrates one embodiment of a cache sharing mechanism having a global replacement mechanism 233. Various local and global replacement policies may be employed in various embodiments, and several examples will be discussed further below. The global replacement mechanism 233 is informed by both controllers 220-1 and 220-2 to update usage tracking information according to the addresses presented on the signal lines 222-1 and 222-2.

In the embodiment of FIG. 2b, set partitioning may be used as described with respect to FIG. 2a; however, other partitioning methods such as way partitioning (discussed below) may also be used. Thus, a cache select signal is used to control the selectors 230 and 232, and accesses may be directed to either or both caches 210-1 and 210-2 based on various considerations. For example, cache utilization may be considered (i.e., how much of each cache is in use, to what extent one processor is using the cache of the other processor, etc.). Moreover, thermal conditions may be considered as well. Utilizing the more remote cache may advantageously spread heat generation. Therefore, inputs from thermal sensors or activity monitors may be used in determining which cache should receive a cacheable data item. Furthermore, the global replacement mechanism 233 may assist in determining which cache is to store a particular item of data.

Figure 3:
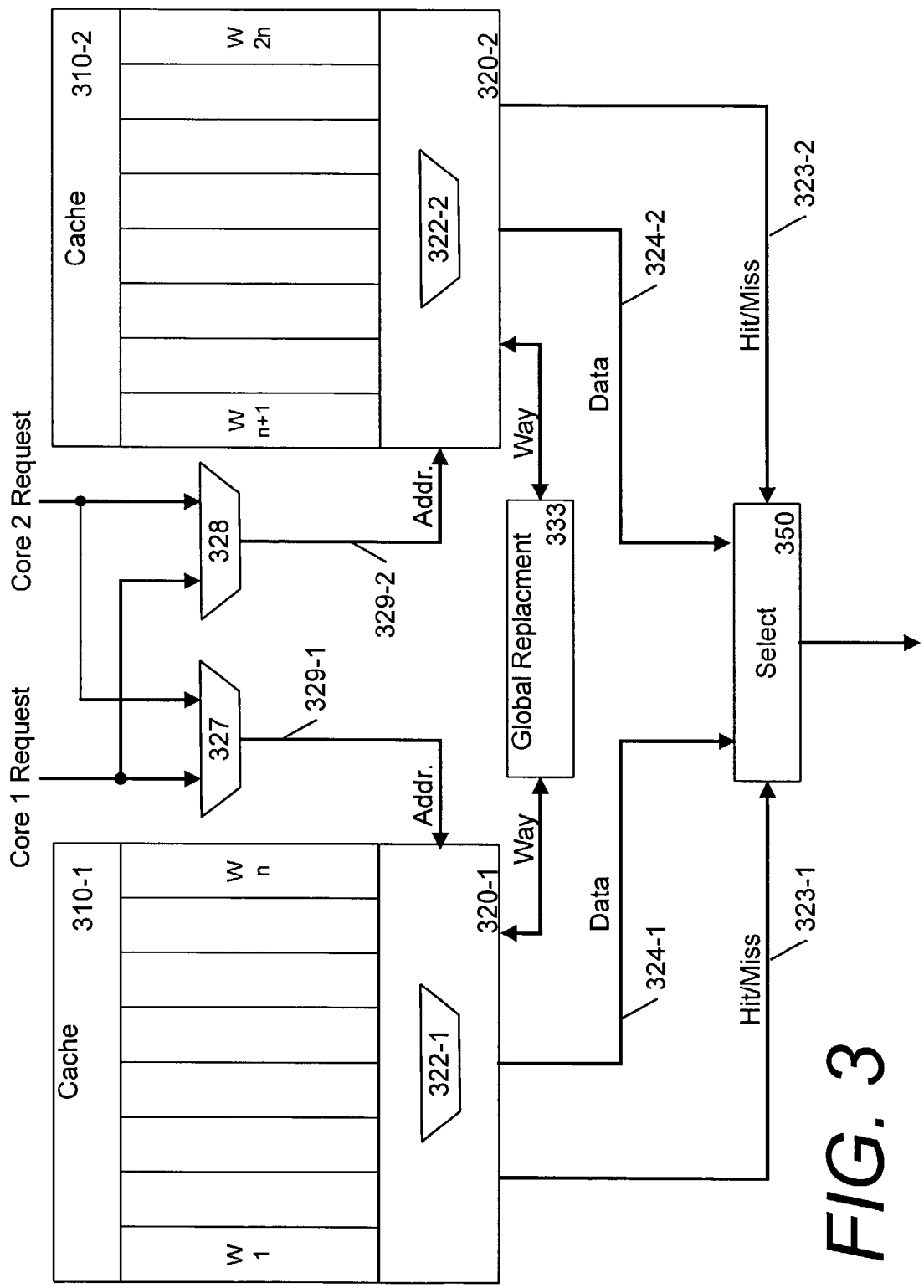
FIG. 3 illustrates one embodiment of a cache sharing mechanism using way expansion.

FIG. 3 illustrates one embodiment of a cache sharing mechanism using way expansion. The embodiment of FIG. 3 includes a first cache 310-1, a second cache 310-2, and associated control logic, respectively 320-1 and 320-2. In this embodiment, a way multiplexer is shown for each cache, respectively 322-1 and 322-2. Moreover, each cache is shown as being divided into n ways. The first cache 320-1 is configured to store ways 1 through n, and the second cache is to store ways n+1 through 2n.

In this embodiment, similar operating modes may be employed as described above. Thus, each processor may use its own cache in a mode where both processors are active, and one or the other processor may use both caches in a mode where one processor is disabled. When one processor is active and using both caches, requests from that processor are selected via selectors 327 and 328. In this case, the requests are transmitted via the signal lines 329-1 and 329-2 to both caches 310-1 and 310-2 via their respective control logic. Each cache looks up the indicated address in its n ways. Effectively, the two cache arrays combine to form a 2n-way set associative cache.

If a hit occurs in the first cache 310-1, then the way multiplexer 322-1 selects the appropriate way and transmits the data via a data bus 324-1 and a hit/miss signal via a signal line 323-1. Likewise, if a hit occurs in the second cache 310-2, then the way multiplexer 322-2 selects the appropriate way and transmits the data via a data bus 324-2 and a hit/miss signal via a signal line 323-2. The select logic 350 receives both hit/miss signals and data from each data bus and selects the appropriate data if a hit occurred.

In one embodiment, a hit may only occur in one of the caches because a global replacement policy is implemented via global replacement logic 333. In the embodiment of FIG. 3, the global replacement logic 333 is coupled to the control logic of each cache to provide a replacement way number. In this embodiment, the two caches are treated as a single 2n-way set associative cache for the purposes of storing and evicting cache data. Therefore, when a new data item is provided to the caches, it is written into one way in one of the arrays, and the global replacement logic 333 may indicate a way to which incoming data should be written. If no ways are available (all contain valid data), then the global replacement logic 333 indicates which data entry to evict to make room for the new data.

Figure 4:
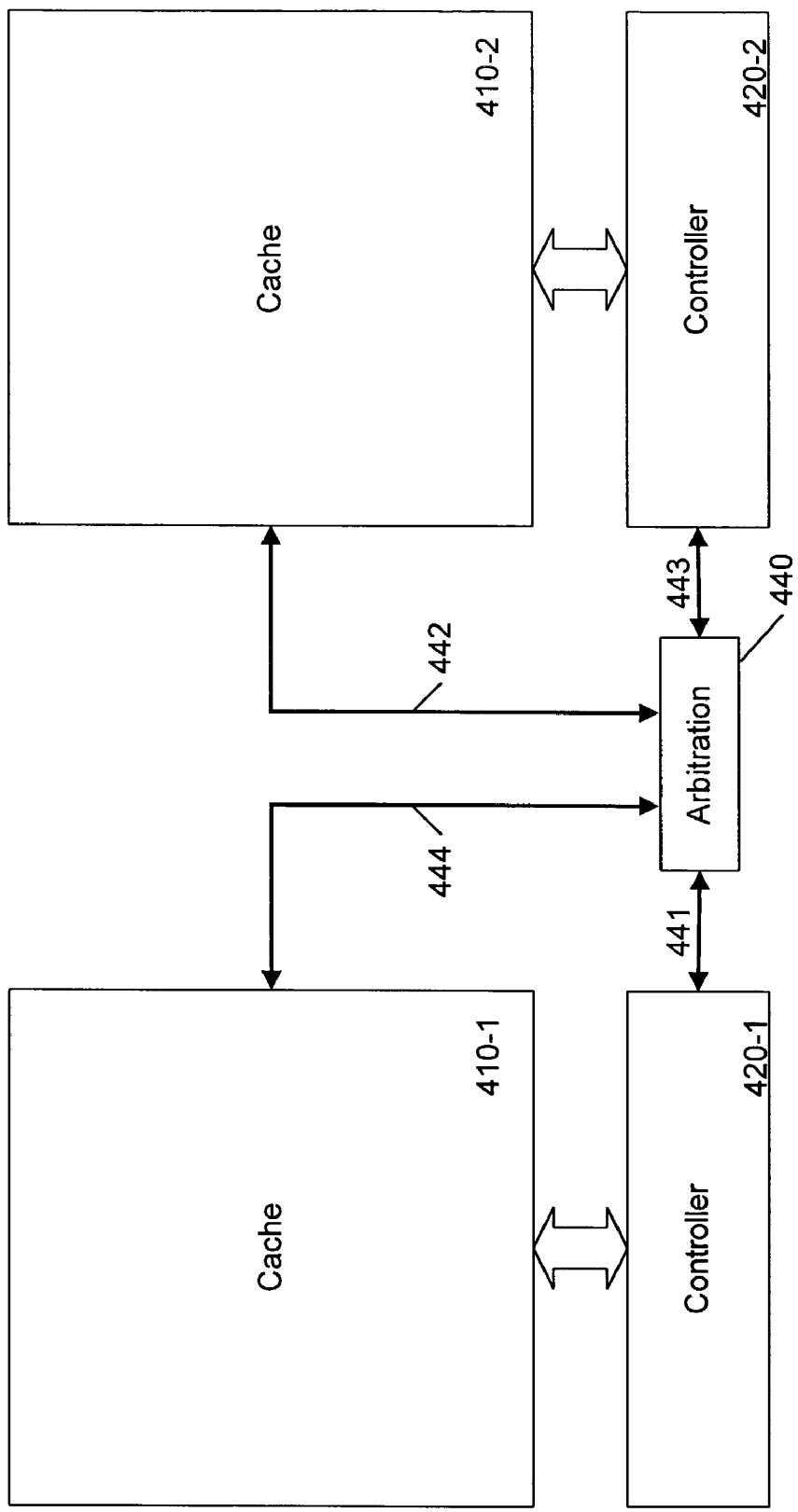
FIG. 4 illustrates one embodiment of a cache sharing mechanism that allows multiple active cores to access the shared caches.

FIG. 4 illustrates one embodiment of a cache sharing mechanism that allows multiple active cores to access the shared caches (e.g., mode four of Table 1). To allow multiple cores to actively access the multiple caches, the embodiment of FIG. 4 adds arbitration logic 440 to arbitrate access to the caches between two controllers 420-1 and 420-2. Thus, in the embodiment of FIG. 4, two cores may both be active and both access caches 410-1 and 410-2 through their controllers 420-1 and 420-2 and arbitration logic that prevents multiple accesses from contending.

In the embodiment of FIG. 4, the arbitration logic 440 communicates with the controllers 420-1 and 420-2 to receive requests from respective cores via signal lines 441 and 443. The arbitration logic 440 may dispatch different contemporaneous requests to the two different caches 410-1 and 410-2 via signal lines 442 and 444 in some embodiments. For example, the caches may form a larger set partitioned cache as discussed with respect to FIG. 2a, allowing accesses to different sets to proceed simultaneously in the different caches. In other embodiments, the arbitration logic may dispatch the same request to both caches 410-1 and 410-2. For example, the caches 410-1 and 410-2 may form one large 2n-way set associative cache as discussed above with respect to FIG. 3, and accesses may be dispatched to both caches to query all ways. Additionally, the caches 410-1 and 410-2 may be multi-ported, allowing multiple simultaneous accesses to proceed to each cache in either of these cases. Thus, the fourth operating mode of Table 1 with both cores active may be used in various implementations.

Figure 5:
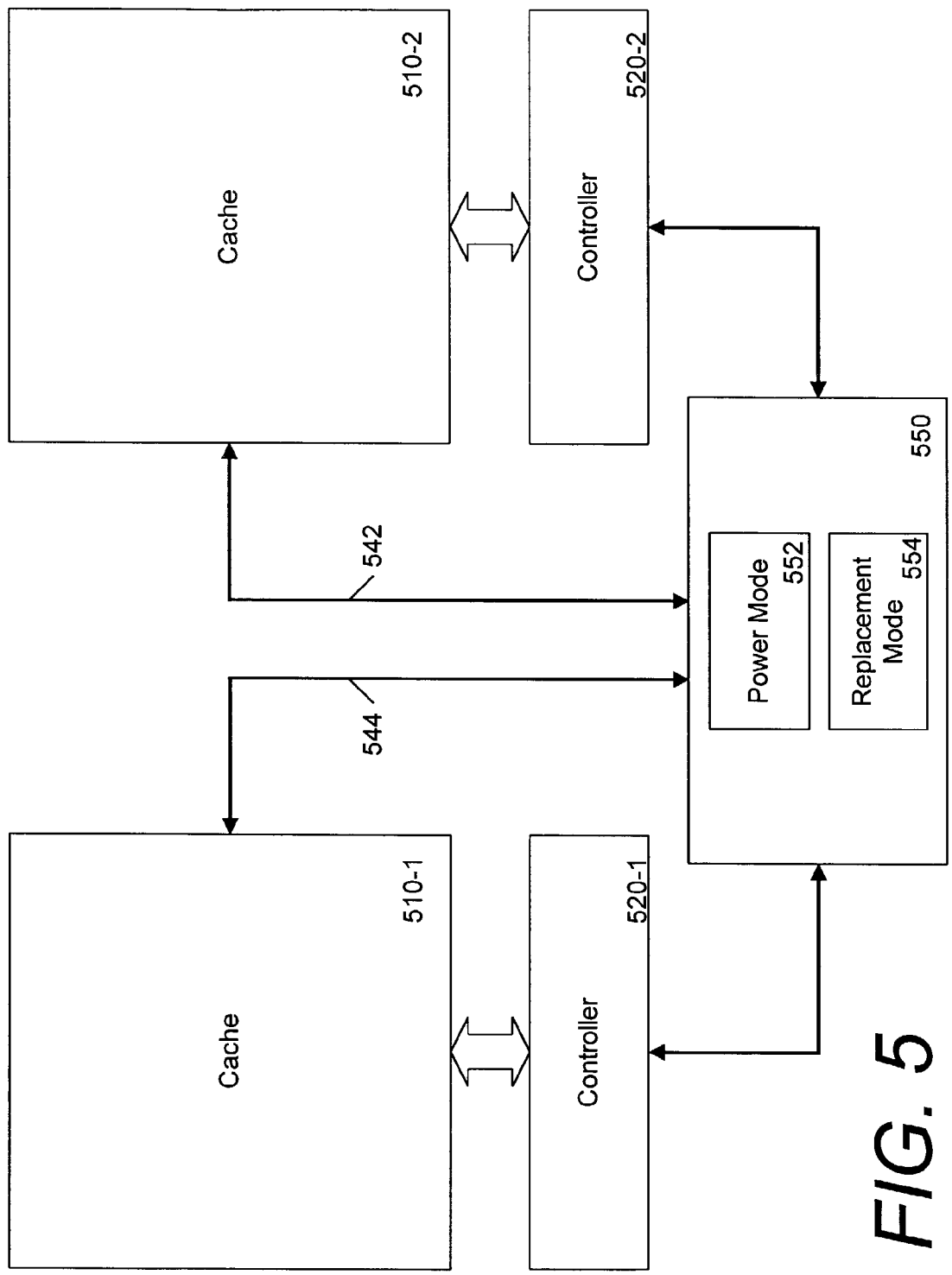
FIG. 5 illustrates one embodiment of a cache sharing mechanism that includes versatile power and replacement mode mechanisms.

FIG. 5 illustrates one embodiment of a cache sharing mechanism that includes configurable or dynamically adjustable power and replacement mode mechanisms. The embodiment of FIG. 5 may implement any of the various partitioning or operating modes described above. In general, global control logic 550 is coupled to both caches 510-1 and 510-2 via respectively cache controllers 520-1 and 520-2. The control logic 550 provides access cycles to the cache 510-1 and 510-2 via respectively signal lines 544 and 542. Therefore, the control logic 550 may perform a selection function to select which one or both of the caches 510-1 and 510-2 should receive access cycles.

Additionally, the control logic 550 includes power mode logic 552 and replacement mode logic 554. The power mode logic 552 may select one of the four operating modes described above with respect to Table 1. In some embodiments, a subset or a superset of these modes may be implemented by the power mode logic 552. The power mode logic 552 may choose the power mode based on measured temperature, operating system inputs, utilization measurements, user input, power consumption measurements, etc. The power mode logic 552 generates various enable signals to enable or disable the various cores and caches according to the mode selected.

The replacement mode logic 554 may also select a variety of modes. In one embodiment, the shared associated cache is a second level (L2) cache, and the modes listed in Table 3 may be provided in one way-expanded embodiment. In other embodiments, different level caches may be operated in manners described herein, and a subset or a superset of these modes may be provided. Additionally, in a set partitioned embodiment, all ways may be within one cache, but some of the ways may be dedicated to a one processor and others to another processor. Thus, modes shown in Table 3 may effectively be implemented in a set partitioned embodiment as well.

TABLE 3

Replacement Policy Modes

| Policy | Description | Supported Modes | "Fair" sharing? |
|---|---|---|---|
| Global LRU | LRU based on all ways across both L2 caches | 1 core w/ shared L2  2 cores w/ shared L2 | No, since one processor can use all ways in the set |
| Round-Robin + Local LRU | Alternate replacements between the two L2 caches; each cache's LRU scheme is used to determine which way to replace in its set | 1 core w/ shared L2  2 cores w/ shared L2 | No, since one processor can use all ways in the set |
| Physical Ownership + Local LRU | Limit replacements by a core to its physical L2 cache; each cache's LRU scheme is used to determine which way to replace in the partial set in its cache | 2 cores w/ shared L2 | Yes, prevents one core from replacing ways in the other core's physical L2 cache |
| Ownership and Usage LRU | Limit replacements by a core to its physical L2 cache unless way(s) in the other cache is/are empty; each cache's LRU scheme is used to determine which way to replace in its set | 2 cores w/ shared L2 | Yes, prevents one core from replacing ways in the other core's physical L2 cache if ways are in use; utilization of an aging mechanism further improves fairness |

In one embodiment, the replacement mode logic 554 dynamically selects an operating mode based on one or more inputs. The replacement mode logic 554 may be user configurable or may respond to cache utilization. For example, if one processor is monopolizing both caches or the cache associated with the other processor, the a replacement policy change may be appropriate to provide more fairness in sharing between the cores.

Figure 6:
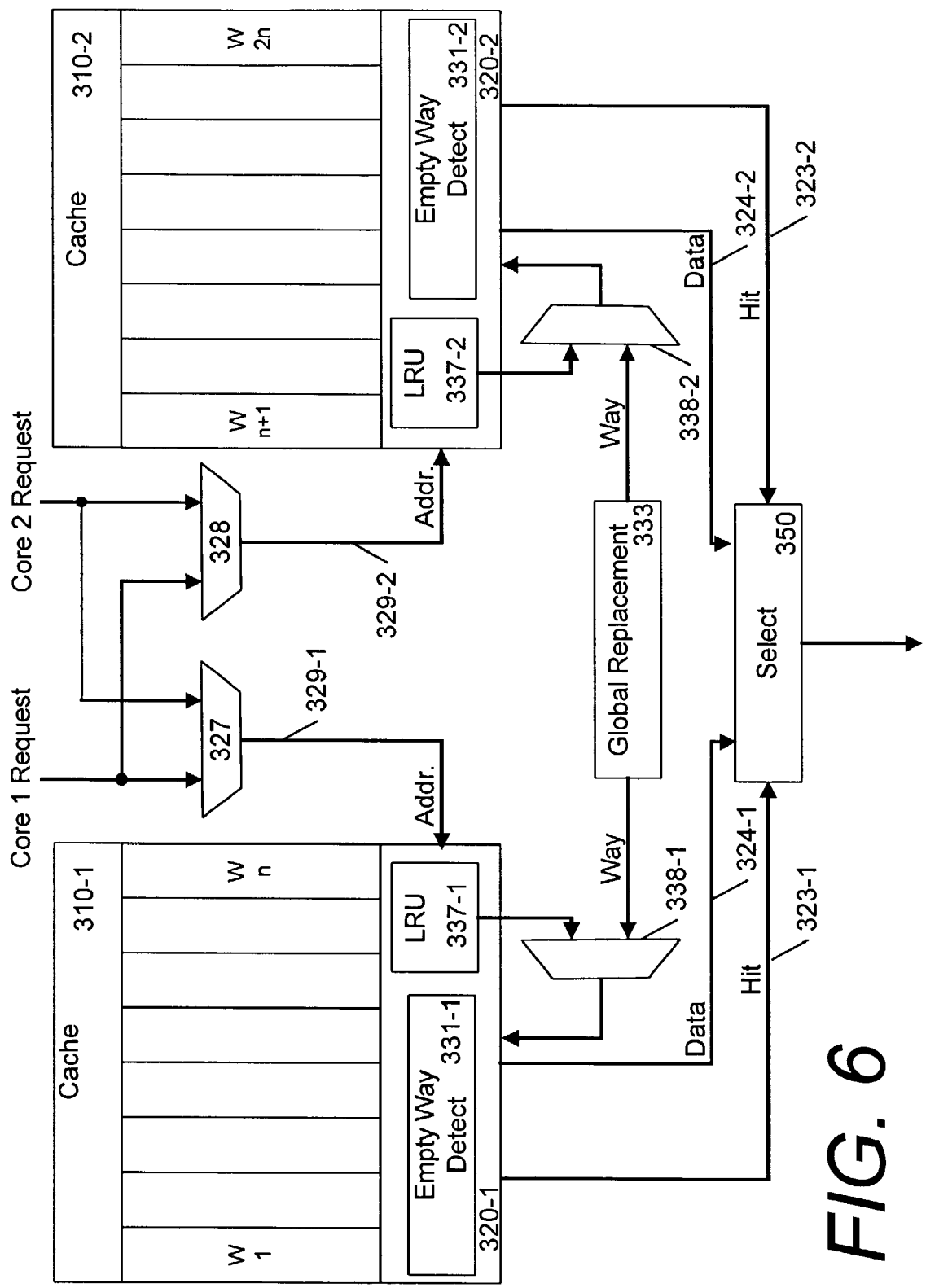
FIG. 6 illustrates one embodiment employing an ownership and usage based replacement policy.

FIG. 6 illustrates one embodiment similar to that of FIG. 3 but also providing additional support for an ownership and usage based replacement policy as detailed in Table 3. The embodiment of FIG. 6 adds empty way detect logic 331-1 and 331-2 to the control logic 320-1 and 320-2 of respectively caches 310-1 and 310-2. The empty way detect logic assists in the implementation of the ownership and usage LRU policy by allowing replacement logic 333 to determine whether one or more ways corresponding to a particular address from one cache are not in use, and in some embodiments utilizing an aging mechanism, for how long. The empty way detect logic detects availability of one or more ways in a cache associated with a processor core other than the processor core originating the cache request. If at least one way is available in a non-associated cache, then data may be written to that cache. In embodiments with age counters for the ways, a threshold may be set to indicate a duration for which a way should remain vacant before it can be allocated by a non-associated processor.

If, for example the second processor has not written to any of the ways in its cache associated with a particular address the first processor is writing to, and the first processor has filled all of its ways corresponding to the same address, then it may be advantageous to allow some write sharing. However, if the second processor also has used the ways in its cache corresponding to that particular line, then the first processor is not allowed to allocate the ways of the cache associated with the second processor.

Additionally, FIG. 6 illustrates both local and global replacement logic, and a means to select between global and local replacement policies. In particular, the global replacement logic 333 and the local replacement logic 337-1 (e.g., LRU replacement logic) for the cache 310-1 each provides a way indication to a multiplexer 338-1. The multiplexer 338-1 selects either the global way number or the way number indicated by the local replacement logic 337-1 and provides that way number to the control logic 320-1. Similarly, the global replacement logic 333 and the local replacement logic 337-2 for the cache 310-2 each provides a way indication to a multiplexer 338-2. The multiplexer 338-2 selects either the global way number or the way number indicated by the local replacement logic 337-2 and provides that way number to the control logic 320-2. The multiplexers 338-1 and 338-2 may be controlled by a control signal provided by replacement policy selection logic that selects a replacement policy depending on the particular operating mode.

Various embodiments may implement this policy with different degrees of strictness. For example, the empty way detect logic may detect if any way is available in one embodiment, but may detect only the condition where all ways are available in the other cache in another embodiment. Of course, other embodiments may allow some subset of the number of ways being available to trigger cross-utilization of caches. In either case, some degree of fairness is provided because one processor can not fully monopolize the other processor's cache if the other processor is using the cache.

Figure 7:
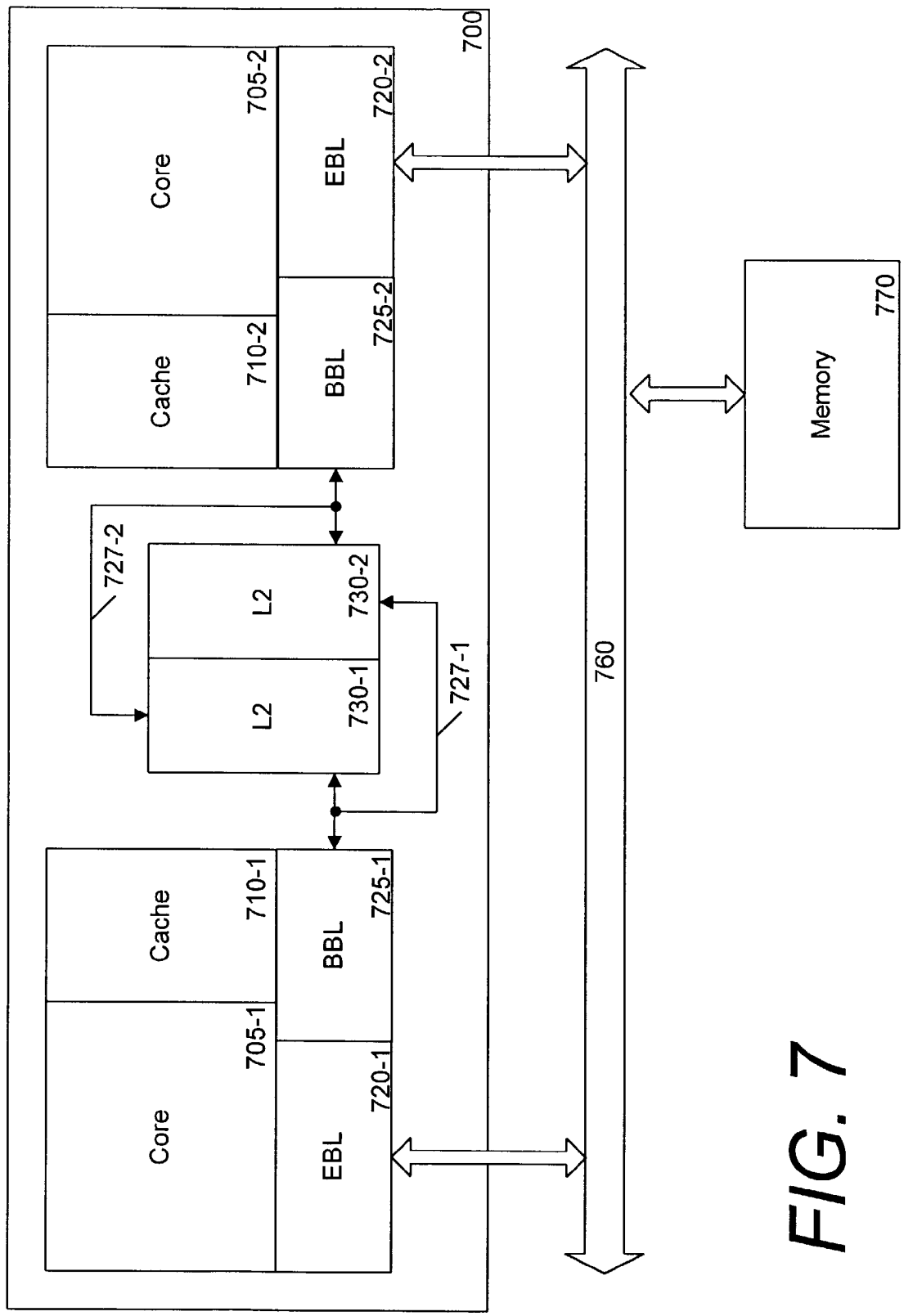
FIG. 7 illustrates one embodiment of a processor architecture that may use various disclosed techniques.

FIG. 7 illustrates one embodiment of a multicore processor 700 having a configuration adaptable for use of various disclosed techniques. In the embodiment of FIG. 7, two cores 705-1 and 705-2 are provided. Each core has an associated level one (L1) cache, respectively 710-1 and 710-2. Additionally, each core has associated external bus logic (EBL) 720-1 and 720-2 and backside bus logic (BBL) 725-1 and 725-2. Each external bus logic interfaces with an external interconnect 760, which may be a bus or point-to-point interconnect. Via the external bus logic, each core may communicate with other bus agents such as processors, I/O devices, or a memory 770. The backside bus logic interfaces with a second level (L2) cache, respectively caches 730-1 and 730-2.

Additionally, a coupling 727-1 is provided to allow the first core 705-1 to communicate with the L2 730-2 associated with the second core 705-2. Similarly, a coupling 727-2 allows the second core 705-2 to communicate with the L2 730-1 associated with the first core 705-1. In one embodiment, the two processors are placed to align the L2 caches to be in close physical proximity (e.g., adjacent). By aligning the two L2 caches to be in close proximity, access to both L2 caches may be achieved without causing an unacceptable amount of added delay in some cases. In some embodiments, some additional delay may be caused by accessing a remote L2, but that delay may be compensated for by the backside bus logic of the requesting processor. In any case, the various different cache sharing techniques disclosed above may be applied to a multiprocessor 700 such as that shown in FIG. 7, thereby allowing efficient sharing with little delay due to data being stored in a non-associated L2 cache and/or with delay that remains transparent to the requesting processor.

The couplings 727-1 and 727-2 provide cache request information ostensibly intended for one L2 cache to be shared with both L2 caches. Likewise, the couplings allow data to be returned from a remote L2 to the same interface as may be used for the associated L2 cache. Thus, limited design modifications may allow cache sharing in some embodiments.

A design may go through various stages, from creation to simulation to fabrication. Data representing a design may represent the design in a number of manners. First, as is useful in simulations, the hardware may be represented using a hardware description language or another functional description language Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. An optical or electrical wave modulated or otherwise generated to transmit such information, a memory, or a magnetic or optical storage such as a disc may be the machine readable medium. Any of these mediums may "carry" the design information, and such design information embodies the design.

Thus, techniques for cache sharing for a chip multiprocessor or multiprocessing system are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
   a plurality of processor cores, including a first core;
   a plurality of physical caches, each physical cache associated with a processor core, including:
      a first cache, associated with the first core, to store a first plurality of N ways; and
      a second cache, not associated with the first core, to store a second plurality of N ways, said first plurality of N ways and said second plurality of N ways being configured for use as a 2N-way set associative cache; and
   a control mechanism to allow the first core to load and store data elements to and from the second cache.

2. The apparatus of claim 1 wherein said control mechanism farther comprises a replacement mechanism to track temporal state of cache accesses across said plurality of physical caches.

3. The apparatus of claim 2 wherein said replacement mechanism is dynamically configurable to select one of a plurality of replacement policies.

4. The apparatus of claim 3 wherein said plurality of replacement policies comprise:
   a global least recently used (LRU) policy in which a least recently used replacement algorithm is implemented across all of the plurality of physical caches;
   a round robin and local LRU policy;
   a physical ownership and local LRU policy.

5. The apparatus of claim 2 wherein a first replacement policy is a global least recently used (LRU) policy in which a least recently used replacement algorithm is implemented across all of the plurality of physical caches.

6. The apparatus of claim 2 wherein a first replacement policy is a round robin and local replacement policy.

7. The apparatus of claim 2 wherein a first replacement policy is a physical ownership and local replacement policy.

8. The apparatus of claim 2 wherein a first replacement policy is an ownership and usage replacement policy.

9. The apparatus of claim 1 wherein a first performance mode uses all cores and caches and wherein a second performance mode uses less than all cores and caches.

10. The apparatus of claim 1 wherein said control mechanism is to treat said plurality of physical caches, which comprise physically distinct arrays, as a single logical cache.

11. The apparatus of claim 1 wherein a first mode uses all caches and all cores, a second mode uses more caches than cores, and wherein a third mode uses one cache and one core.

12. The apparatus of claim 1 wherein said apparatus comprises machine readable data carried on a machine readable medium.

13. A method comprising:
   configuring a first plurality of N ways of a first cache of a plurality of physical caches and a second plurality of N ways of a second cache of the physical caches for use as 2N-way set associative cache;
   generating a first cache access request from a first processor of a plurality of processors;
   directly querying the plurality of physical caches each associated with one of said plurality of processors to satisfy the first cache access request, where at least one of said plurality of physical caches is not associated with said first processor.

14. The method of claim 13 wherein querying the plurality of physical caches comprises:
   requesting data from a first one of the plurality of physical caches if an address falls within a first range;
   requesting data from a second one of the plurality of physical caches if the address falls within a second range.

15. The method of claim 13 wherein querying the plurality of physical caches comprises:
   testing whether a match occurs in one of a first plurality of ways in a first one of said plurality of physical caches;
   testing whether the match occurs in one of a second plurality of ways in a second one of said plurality of physical caches.

16. The method of claim 13 further comprising:
   implementing a global replacement policy across said plurality of physical caches.

17. The method of claim 16 wherein said global replacement policy is dynamically configurable to select one of a plurality of policies.

18. The method of claim 16 wherein said global replacement policy comprises one of:
- a global least recently used policy in which a least recently used replacement algorithm is implemented across all of the plurality of physical caches;
- a round robin and local replacement policy;
- a physical ownership and local replacement policy;
- an ownership and usage replacement policy.

19. The method of claim 13 further comprising:
operating in a plurality of modes, wherein a first mode uses all caches and all cores, a second mode uses all caches and a subset of all cores, and wherein a third mode uses one cache and one core.

20. A system comprising:
- a memory to store information;
- a multiprocessor component comprising:
  - a first processor core having an associated first physical cache;
  - a second processor core having an associated second physical cache, wherein said first physical cache is not associated with said second processor core and said second physical cache is not associated with said first processor core; and
- a cache sharing mechanism to perform way expansion sharing to allow said first processor core and said second processor core to share said first physical cache and said second physical cache to cache information from said memory.

21. The system of claim 20 wherein said cache sharing mechanism is disabled in a first mode and enabled in a second mode.

22. The system of claim 21 wherein said first mode comprises an all cores active and no caches shared mode.

23. The system of claim 22 wherein said second mode comprises a one core active and all caches shared mode.

* * * * *